Nov. 1, 1932.     A. DINA     1,885,419
DOWSER
Filed Dec. 20, 1930
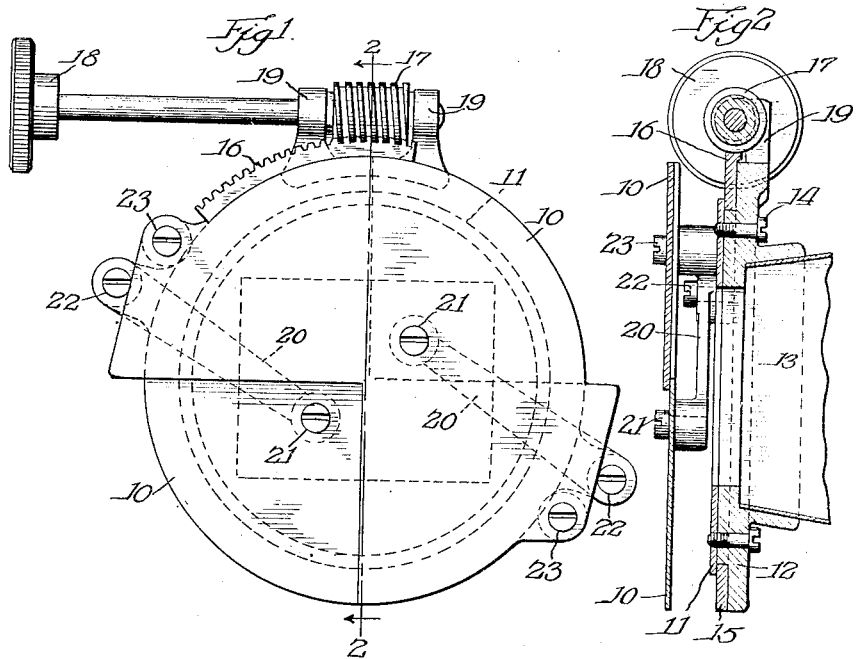
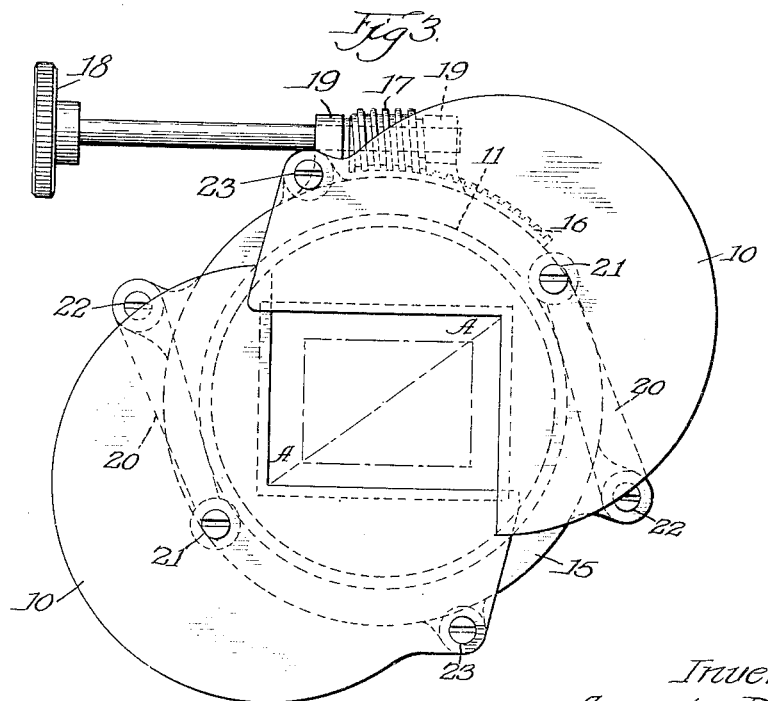
Inventor:
Augusto Dina Patented Nov. 1, 1932

1,885,419

UNITED STATES PATENT OFFICE

AUGUSTO DINA, OF NEW YORK, N. Y.

DOWSER

Application filed December 20, 1930. Serial No. 503,682.

This invention relates broadly to closures and more particularly to shutter mechanism.

The improvement herein described pertains to a shutter mechanism for use as a dowser in motion picture cameras or projection machines; the primary aim of the invention being to improve and simplify the construction at present employed for intercepting the light rays passing to the film in a camera or to the screen in a projection machine.

While I shall describe my invention as being particularly useful as a dowser in motion picture cameras and projection machines, it will be understood that the invention is capable of embodiment in whole or in part in similar and non-analogous arts, and therefore, finds a wide field of utility for use in apparatus other than that described here.

Broadly, my invention includes the provision of an improved form of shutter, preferably arranged in sections which are adapted to move toward each other, the meeting edges of the sections moving in fixed angular relation with respect to the transverse axis of the opening, or in fact, with respect to any diametrical line passing through the opening.

The principal objects and advantages which characterize the present invention reside in the provision of an improved shutter mechanism characterized by the embodiment therein of means for causing the sections thereof to move uniformly; the provision of a shutter mechanism wherein the sections thereof are bodily displaced to uniformly open or close an opening; the provision of a shutter mechanism wherein a section thereof is caused to move in a right line by rotary means; the provision of an improved shutter mechanism wherein the sections operate to increase or decrease the size of an opening simultaneously along at least two edges thereof; the provision of a shutter mechanism which operates to increase or decrease the size of an opening along all edges thereof uniformly; and the provision of an improved shutter operating mechanism including rotary actuating means and rectilinearly displaced shutter sections connected thereto.
A further object of my invention is to provide a structure of the type described which permits the shutter to be easily and quickly manipulated by a handle protruding from a convenient point for operation, and further provides a mounting for the shutter sections which continually hold the sections during their movement in a substantially fixed plane so that the opening is gradually closed or opened, and the light beam at the end of the closing movement of the shutter sections, is quickly and completely shut off. A still further object of my invention is to provide a simple and inexpensive structure which is efficient and reliable in its operation.

Other objects and advantages of my invention will be apparent from the following detailed description of several convenient embodiments thereof when taken in connection with the accompanying drawing which forms a part hereof.

Figure 1 is an elevational view of this invention in one position.

Figure 2 is a vertical sectional view taken on line 2—2 of Figure 1 looking in the direction indicated by the arrows, and Figure 3 is an elevational view showing the invention in a different position.

The shutter is preferably of the sliding gate type. It is provided in two sections, each moving toward the center from opposite sides, when the light opening is closed. These sections are arranged with cut out portions having angularly related edges so that the light is closed out from the top and bottom as well as from the sides simultaneously, and by the diminishing in dimension of substantially rectangular opening.

Referring now more particularly to the drawing a convenient form of shutter structure embodying the principles of my invention is shown. Here the shutter sections are such that when they are moved to closed position the light beam grows smaller towards the center from all sides. This arrangement also permits smaller framing and also smaller pictures when photographing, and permits of superimposing and shadow photography. In this form each shutter section 10 is approximately three-fourths of a complete disc and moves toward the opposite section along the diagonal line of the rectangular opening substantially as indicated at dotted lines at A—A. Substantially the same form of mounting is furnished for these sections 10. A ring plate 11 is secured to an annular member 12 at the end of housing 13 by means of screws 14. A ring 15 rides in the groove thus formed and is furnished with a segment 16 along a portion of its periphery for cooperation with a worm 17. The worm 17 may be fixed to an operating handle 18 supported in bearings 19 carried on member 12.

Levers 20 are likewise provided to connect points 21 on shutter sections 10 to the fixed lugs 22. Screws 23 pivotally fasten each section to ring 15 at diametrically opposed points which are the movable points of these sections, as they are rotated with the ring when it is revolved by turning handle 18. In a similar manner the levers 20 function to swing the opposite ends of the shutter sections forward so that each shutter moves bodily forward along the diagonal line of the rectangular opening. The effective length of levers 20 is conveniently substantially equal to the radial distance of the centers of pivot screws 23 from the center of ring 15. Thus the opening maintains its rectangularity in full open or closed and in all intermediate positions.

From the foregoing description it will be seen that I have provided an improved form of shutter mechanism capable of shutting off the light partially or completely from the front of the lamp house of a motion picture machine or for changing the amount of light admitted to the film in a camera. The mechanism is simple and functions to diminish the size of the opening from the outer sides so that the light beam grows smaller toward the center until completely shut off. This provides of course a structure in which the shutter sections slide toward each other and in this respect I prefer that the meeting edges travel parallel to each other, as well as parallel to a diametrical line passing through the center of the opening. This diametrical line may be the vertical or horizontal axis of the opening, or it may be at any angle through the center, but in any event, I have reference to a fixed line.

Having thus described my invention and illustrated its use, I claim:

1. In a device of the character described, in combination, a plurality of shutter sections for an opening each having right angularly cut recesses forming complemental edges, pivots for said sections, means for relatively moving the pivots of said sections, and relatively movable members for maintaining the complemental edges of said sections substantially parallel.

2. In a device of the character described, in combination, a plurality of shutter sections for an opening each having right angularly cut recesses forming complemental edges, pivots for said sections, means for relatively moving the pivots of said sections, said sections moving in paths diagonally across the axis of the opening, and relatively movable members for maintaining the complemental edges of said sections substantially parallel.

3. In a shutter mechanism, the combination with a housing provided with an opening therein, of shutter means supported adjacent said opening comprising complemental shutter sections having cut away portions provided with fixed angularly related edges; means for actuating said shutter sections comprising an element rotatably mounted on said housing and pivotally connected with said shutter sections, a toothed segment on said element and a worm gear, with handle for turning same, mounted on said housing and meshing with said segment; and means pivotally connected to said housing and said shutter elements to prevent any angular displacement of said shutter elements during said actuation.

4. In a shutter mechanism, the combination with a housing provided with an opening therein, of shutter means supported adjacent said opening comprising complemental shutter sections having cut away portions provided with fixed angularly related edges and adapted to close said opening when moved together; means for actuating said shutter sections to open and closed positions including a rotatable actuating element pivotally connected with said shutter sections and adapted to impart a movement to said shutter sections gradually bringing said edges toward each other from the sides of said opening to the center thereof; and means for preventing relative rotation of said shutter sections during said actuation.

5. In a shutter mechanism, the combination with a housing provided with an opening therein, of shutter means supported adjacent said opening comprising complemental shutter sections having cut away portions provided with right angularly related edges defining a rectangular opening and adapted to close said opening when moved together; means for actuating said shutter sections to open and closed positions including a rotatable actuating element pivotally connected with said shutter sections and adapted to impart a movement to said shutter sections, gradually decreasing said rectangular opening by bringing said edges toward each other from the sides of said opening to the center thereof, and means for maintaining the rectangularity of said opening and preventing any angular displacement thereof during said actuation.

6. In a device of the character described, in combination, a plurality of shutter sections each having angularly cut recesses forming complemental edges for a polygonal opening, and each of said shutter sections being mounted on a plurality of pivots; means for moving said pivots; and means for preventing angular displacement of said shutter sections.

7. In a device of the character described, in combination, a plurality of shutter sections each having two angularly related edges forming complemental sides of a polygonal opening, and each mounted on a plurality of pivots; a common rotatable member attached to one of the pivots on each of said sections for imparting movement to said sections; means for rotating said rotatable member; and, a plurality of members attached respectively to another of the pivots on each of said shutter sections for preventing angular displacement of said shutter sections.

In testimony whereof I have hereunto signed my name.

AUGUSTO DINA.